(12) United States Patent
Hwan G et al.

(10) Patent No.: US 7,104,700 B2
(45) Date of Patent: Sep. 12, 2006

(54) GAIN FLATTENING FILTER AND GAIN FLATTENED OPTICAL FIBER AMPLIFIER EMPLOYING THE SAME

(75) Inventors: Seong-Taek Hwan G, Pyongtaek-shi (KR); Byung-Chang Kang, Yongin-shi (KR); Yun-Je Oh, Yongin-shi (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 146 days.

(21) Appl. No.: 10/315,840

(22) Filed: Dec. 10, 2002

(65) Prior Publication Data

US 2003/0179997 A1 Sep. 25, 2003

(30) Foreign Application Priority Data

Mar. 21, 2002 (KR) ............... 2002-15252

(51) Int. Cl.
*G02B 6/32* (2006.01)
(52) U.S. Cl. ...................................... 385/73
(58) Field of Classification Search .............. 385/34, 385/73, 27, 39, 24; 359/588–590
See application file for complete search history.

(56) References Cited

U.S. PATENT DOCUMENTS

| | | | |
|---|---|---|---|
| 6,198,858 B1 * | 3/2001 | Pan et al. | 385/24 |
| 6,611,378 B1 * | 8/2003 | Wang et al. | 359/588 |
| 6,865,315 B1 * | 3/2005 | Hulse | 385/27 |
| 6,870,991 B1 * | 3/2005 | Ohta et al. | 385/50 |
| 2002/0154387 A1 * | 10/2002 | Mori et al. | 359/337.1 |
| 2005/0248832 A1 * | 11/2005 | Sommer et al. | 359/337 |

FOREIGN PATENT DOCUMENTS

| | | |
|---|---|---|
| JP | 2001-013362 | 1/2001 |
| JP | 2001-201657 | 7/2001 |
| JP | 2001-296446 | 10/2001 |
| JP | 2001296446 A | 10/2001 |
| JP | 2002-182061 | 6/2002 |
| JP | 2002-182062 | 6/2002 |
| JP | 2003-084168 | 3/2003 |
| WO | WO 00/45479 A1 | 8/2000 |

* cited by examiner

*Primary Examiner*—Frank G. Font
*Assistant Examiner*—James P. Hughes
(74) *Attorney, Agent, or Firm*—Cha & Reiter,L.L.C.

(57) ABSTRACT

A gain flattening filter is provided to reduce volume and manufacturing cost of a gain flattened optical fiber amplifier, even when a required peak loss exceeds the limit of each dielectric thin film filter. The inventive gain flattening filter includes: a housing having a first opening and a second opening; a first ferrule disposed at one end of the housing, the first ferrule having an opening through which an input of an optical fiber is packaged; a second ferrule disposed at the other end of the housing, the second ferrule having an opening through which an output of the optical fiber is packaged; and, a plurality of thin film filters disposed in sequence between the first and second ferrules for flattening gain of optical signals passing therethrough.

6 Claims, 6 Drawing Sheets

GAIN FLATTENING FILTER AND GAIN FLATTENED OPTICAL FIBER AMPLIFIER EMPLOYING THE SAME

CLAIM OF PRIORITY

This application claims priority to an application entitled "Gain flattening filter and gain flattened optical fiber amplifier employing the same" filed in the Korean Industrial Property Office on Mar. 21, 2002 and assigned Serial No. 2002-15252, the contents of which are hereby incorporated by reference.

BACKGROUND OF THE INVENTION

1. Field of the Invention

The present invention relates to an optical fiber amplifier and more particularly to a gain flattening filter used in a gain flattened optical fiber amplifier.

2. Description of the Related Art

As the recent increase in the quantity of data in geometrical progression requires expansion of the transmission band width of the wavelength division multiplexing optical communication system, it has been widely accepted now that the wavelength division multiplexing optical communication system must be equipped with a gain flattened optical fiber amplifier. A gain flattening filter employed in the gain flattened optical fiber amplifier may be constructed using either active elements or passive elements. Among these two, the utilization of passive elements is accepted more. As passive elements, optical fiber gratings or dielectric thin film filters are typically deployed. However, the gain flattening filters employing the optical fiber gratings are not reliable under variable environmental factors, such as temperature and moisture, thus dielectric thin film filters are a better choice to be used in the gain flattening filter.

According to the location of the gain flattening filter in the optical power amplifier, the gain flattening filters can be classified into two types: end filters and midway filters. An end filter is located at the rear end of the amplifying medium, while a midway filter is located at the middle portion of the amplifying element. The end filter has a drawback in that it tend to reduce as much gain of the optical fiber amplifier as its own insertion loss, while having an advantage in that it can be designed to limit the peak loss to within 5 dB. In contrast, the midway filter has an advantage in that it compensates for the basic insertion loss of the midway filter in the amplifying element, while having a disadvantage in that it requires a peak loss of at least 7 dB in the design process thereof. There is a limitation in utilizing the dielectric thin film filter as a midway filter as it is difficult to reach a peak loss of at least 6 dB due to the difficulty in its coating process.

Figure 1:
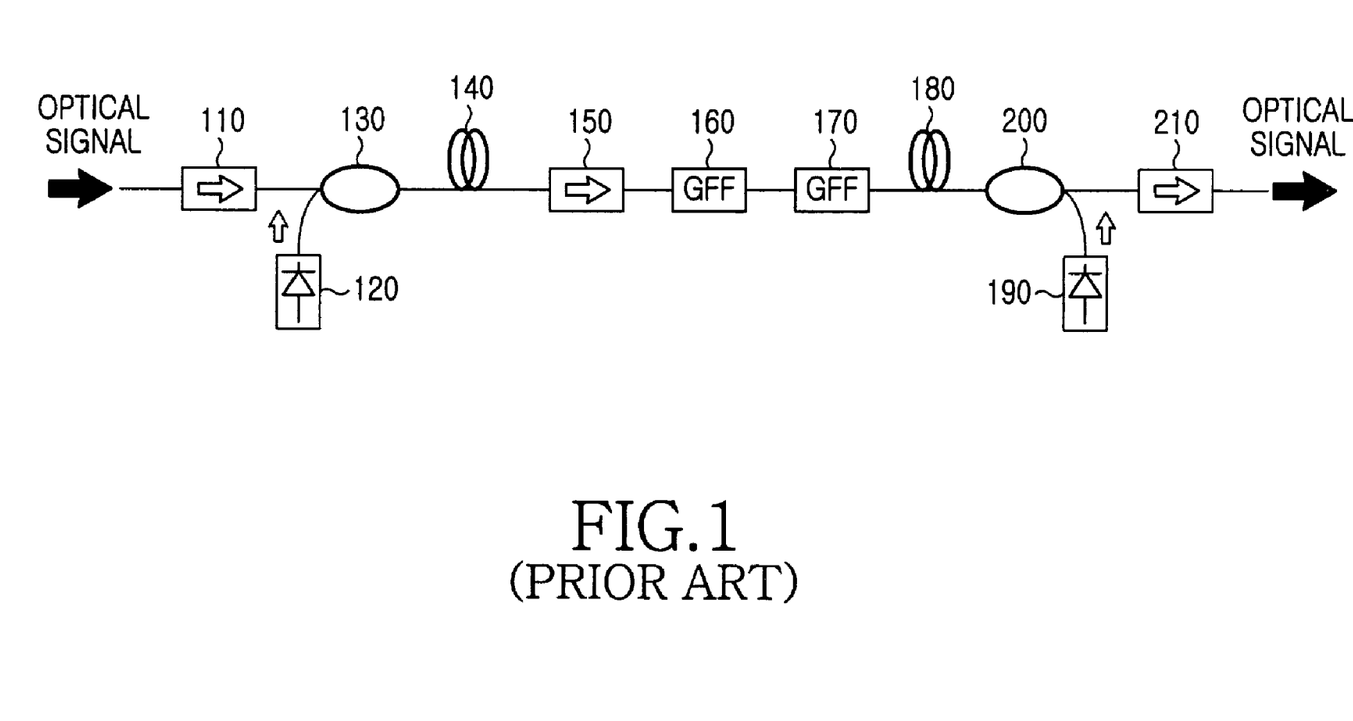
FIG. 1 is a schematic view illustrating the configuration of a conventional gain flattened optical fiber amplifier.
Figure 2:
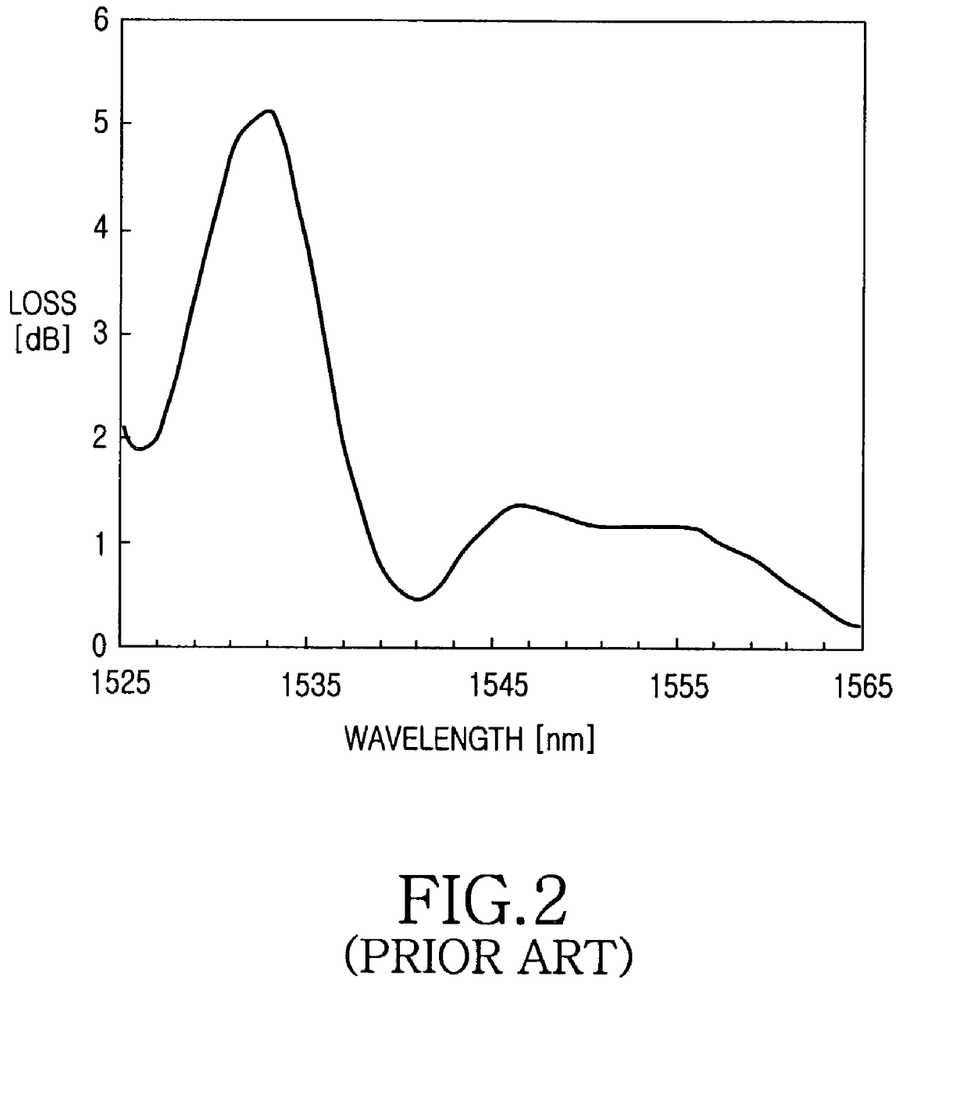
FIG. 2 is a graph depicting a loss curve of a first or second gain flattening filter employed in the gain flattened optical fiber amplifier shown in FIG. 1.

FIG. 1 is a schematic view illustrating the configuration of a conventional gain flattened, optical fiber amplifier. FIG. 2 is a graphical illustration depicting a loss curve of a first or second gain flattening filter employed in the gain flattened optical fiber amplifier shown in FIG. 1. As shown in FIG. 1, the conventional optical fiber amplifier includes first to third isolators 110, 150, and 210, first and second pumping light sources 120 and 190, first and second wavelength selective couplers 130 and 200, first and second erbium-doped optical fibers 140 and 180, and first and second gain flattening filters 160 and 170.

In operation, the first isolator 110 allows an optical signal inputted to the optical fiber amplifier to pass intact through the first isolator 110, while intercepting a light inputted in a direction opposite to that of the optical signal—that is, a light inputted from the first wavelength selective coupler 130. The first wavelength selective coupler 130 combines the optical signal inputted from the first isolator 110 and a pumping light inputted from the first pumping light source 120, then outputs the combined optical signal to the first erbium-doped optical fiber 140. The first pumping light source 120 pumps the first erbium-doped optical fiber 140 by exciting erbium ions in the first erbium-doped optical fiber 140. A laser diode capable of outputting a pumping light may be utilized as the first pumping light source 120. The first erbium-doped optical fiber 140 is pumped by the pumping light inputted through the first wavelength selective coupler 130, then amplifies and outputs the optical signal inputted through the first wavelength selective coupler 130.

The second isolator 150 allows the optical signal inputted through the first erbium-doped optical fiber 140 to pass intact through the second isolator 150, while intercepting light inputted in a direction opposite to that of the optical signal. The first and second gain flattening filters 160 and 170 are midway filters and serve to sequentially flatten the gain of the optical signal inputted through the second isolator 150. Each of the first and second gain flattening filters 160 and 170 includes a dielectric thin film filter. Referring to FIG. 2, note that the peak loss is about 5 dB, as indicated by the loss curve of the first gain flattening filter 160 or the second gain flattening filter 170. As the gain flattened, optical fiber amplifier requires a peak loss of about 10 dB, the first and second gain flattening filters 160 and 170 each having a loss peak of 5 dB are connected in series with each other in the gain flattened optical fiber amplifier.

The second erbium-doped optical fiber 180 is pumped by a pumping light inputted through the second wavelength selective coupler 200, then amplifies and outputs the optical signal inputted from the second wavelength selective coupler 200. The second wavelength selective coupler 200 outputs the optical signal inputted from the second pumping light source 190 to the second erbium-doped optical fiber 180 and outputs the optical signal inputted from the second erbium-doped optical fiber 180 to the third isolator 210. The third isolator 210 allows the optical signal inputted through the second wavelength selective coupler 200 to pass intact through the third isolator 210, while intercepting a light inputted in a direction opposite to that of the optical signal.

As described above, in the case where the gain flattened optical fiber amplifier requires a peak loss exceeding the limit of each dielectric thin film filter, a plurality of gain flattening filters, each including a dielectric thin film filter, must be connected in series with each other in the conventional gain flattened, optical fiber amplifier, thereby increasing the volume and manufacturing cost of the entire gain flattened optical fiber amplifier.

SUMMARY OF THE INVENTION

The present invention overcomes the above-described problems, and provides additional advantages, by providing a gain flattened optical fiber amplifier, which can reduce the volume and manufacturing cost found in the prior art even when a required peak loss exceeds the limit of each dielectric thin film filter.

Accordingly, there is provided a gain flattening filter employed in an optical fiber amplifier which includes a housing having a first opening and a second opening; a first ferrule disposed at one end of the housing, the first ferrule having an opening through which an input of an optical fiber is packaged; a second ferrule disposed at the other end of the housing, the second ferrule having an opening through which an output of the optical fiber is packaged; and, a plurality of thin film filters disposed in sequence between the first and second ferrules for flattening gain of optical signals passing therethrough.

In accordance with another aspect of the present invention, there is provided a gain flattened erbium-doped optical fiber amplifier comprising: a first erbium-doped optical fiber amplifying and outputting an inputted optical signal; a second erbium-doped optical fiber re-amplifying and outputting the optical signal having been amplified; and, a gain flattening filter. The gain flattening filter comprises: a housing having a hole formed in and through the housing; a first ferrule inserted in a first end of the housing, the first ferrule having a hole through which an input-side optical fiber is packaged; a second ferrule inserted in a second end of the housing, the second ferrule having a hole through which an output-side optical fiber is packaged; and, a plurality of thin film filters disposed between the first and second ferrules, each of the thin film filters having a predetermined loss curve.

According to another aspect of the invention, the first and second ferrules comprises end surfaces opposed to each other and the respective end surface is inclined at a predetermined angle. Meanwhile, the gain flattening filter further includes a first lens disposed between the first ferrule and the thin film filters, the first lens collimating light emitted through one end of the input of the optical fiber; and, a second lens disposed between the thin film filters and the second ferrule, the second lens collecting light having been transmitted through the thin film filters, wherein the first lens comprises one end surface opposed to the first ferrule, and the second lens comprises one end surface opposed to the second ferrule, the end surfaces of the first and second lenses being inclined at a predetermined angle, respectively. The housing is shaped as a hollow cylinder. Further, the first ferrule is shaped as a hollow cylinder with a predetermined diameter substantially equal to a diameter of the optical fiber. The first and the lenses are one of a graded-index rod lens having a predetermined pitch and a refractive index.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. For the purpose of clarity and simplicity, a detailed description of well-known functions and configurations incorporated herein will be omitted as it may make the subject matter of the present invention rather unclear.

Figure 3:
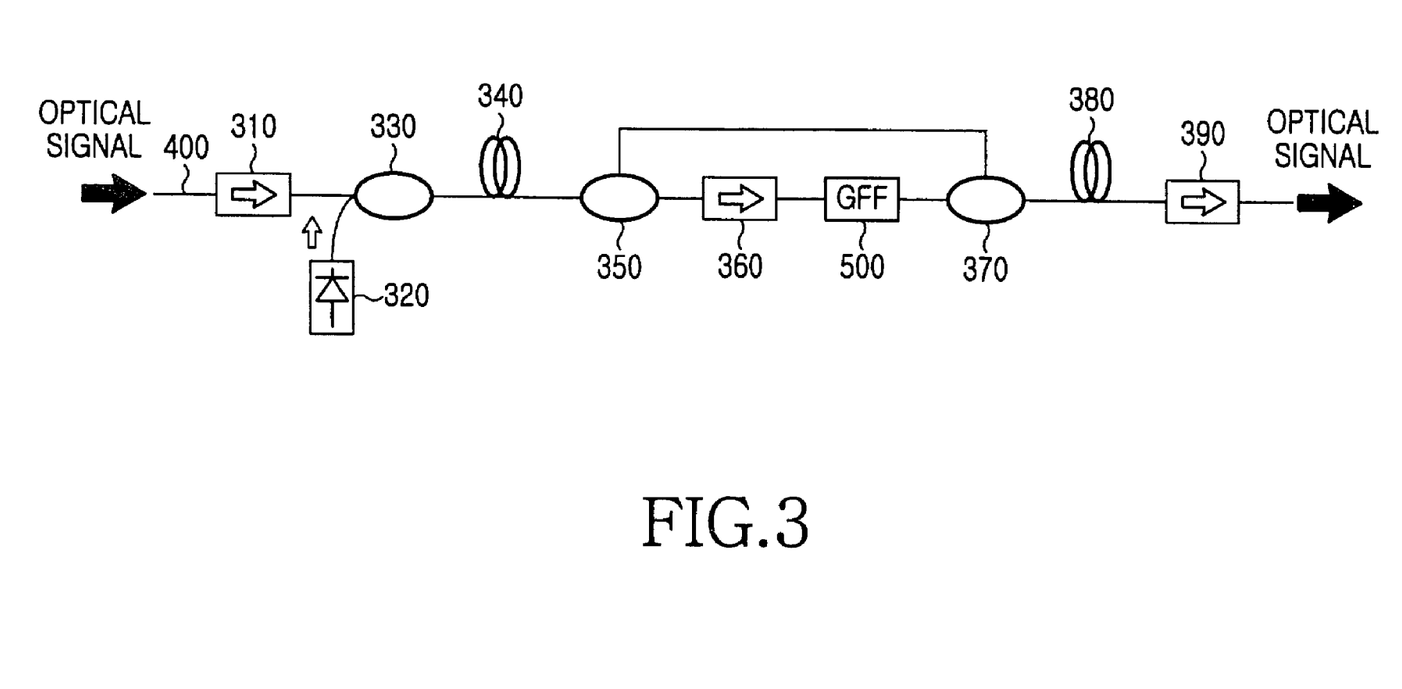
FIG. 3 is a schematic view illustrating the configuration of a gain flattened optical fiber amplifier according to a preferred embodiment of the present invention.
Figure 4:
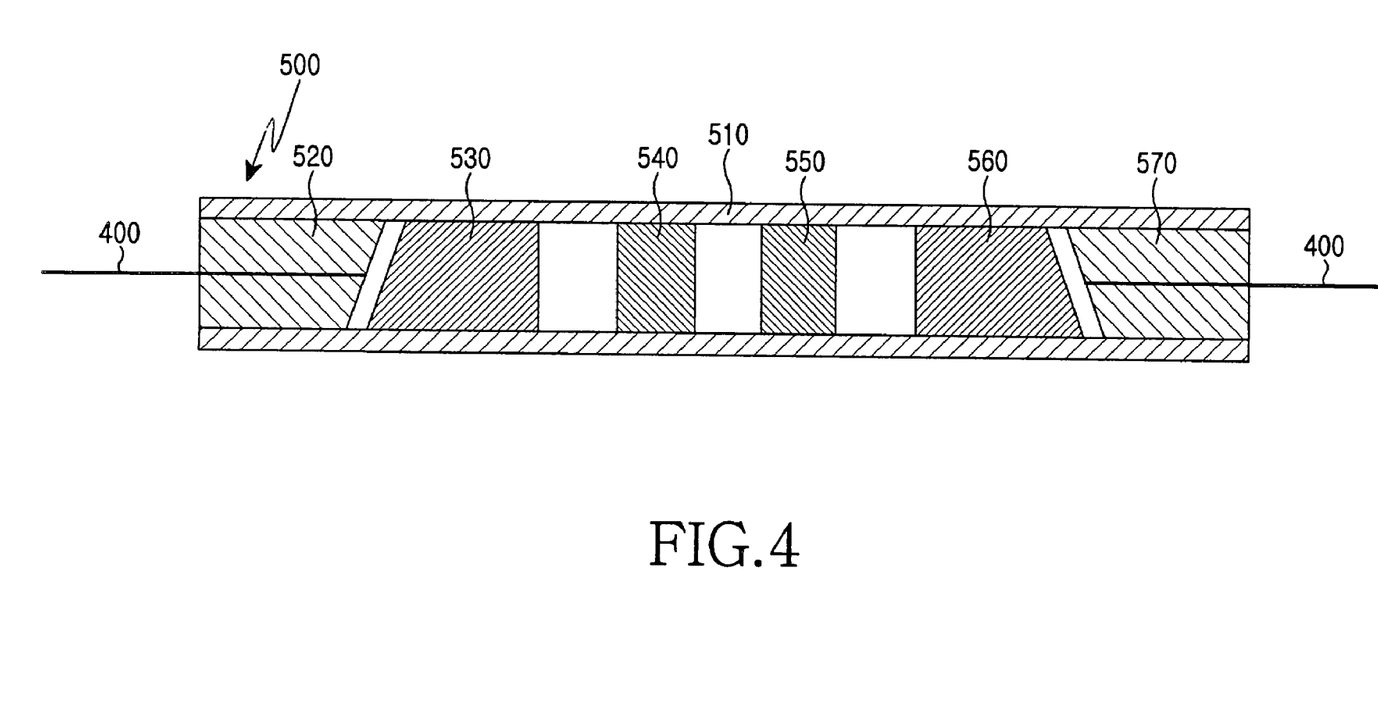
FIG. 4 is a sectional view of a gain flattening filter shown in FIG. 3.
Figure 5:
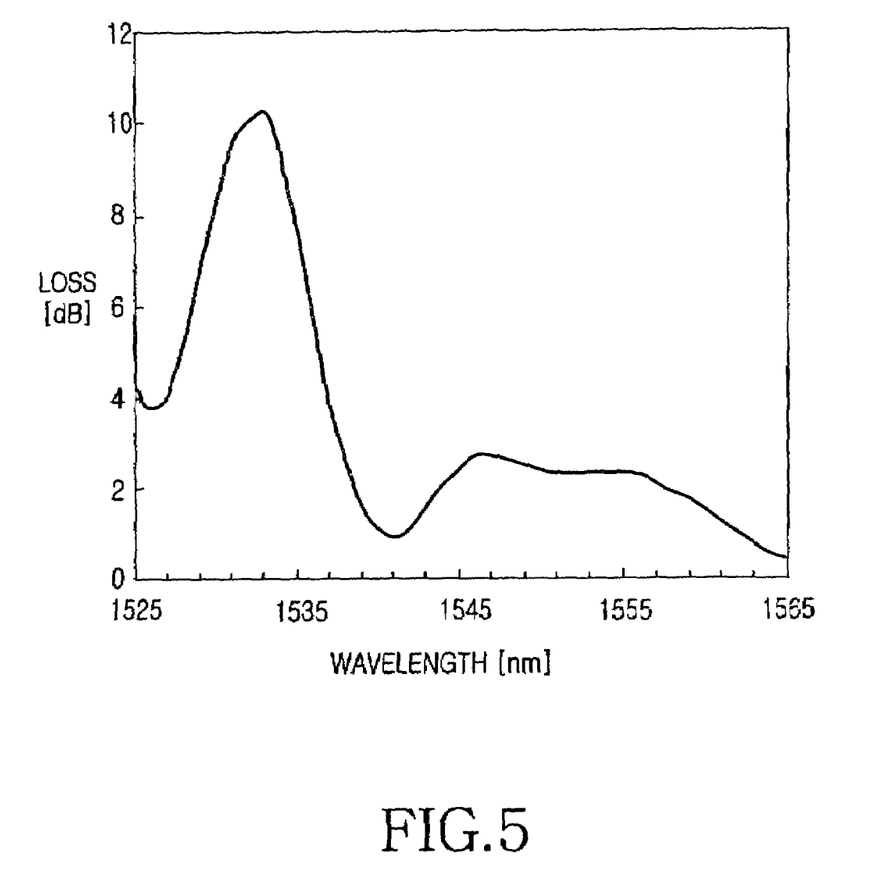
FIG. 5 is a graph depicting a loss curve of the gain flattening filter shown in FIG. 3.

FIG. 3 is a schematic view illustrating the configuration of a gain flattened, optical fiber amplifier according to a preferred embodiment of the present invention. FIG. 4 is a sectional view of the gain flattening filter shown in FIG. 3, and FIG. 5 is a graphical illustration depicting a loss curve of the gain flattening filter shown in FIG. 3.

As shown in FIG. 3, the gain flattened, optical fiber amplifier according to the embodiment of the present invention includes first to third isolators 310, 360, and 390, a pumping light source 320, first to third wavelength selective couplers 330, 350 and 370, first and second erbium-doped optical fibers 340 and 380, and a gain flattening filter 500.

In operation, the first isolator 310 allows an optical signal inputted to the optical fiber amplifier to pass intact through the first isolator 310, while intercepting a light inputted in a direction opposite to that of the optical signal, that is, a light inputted from the first wavelength selective coupler 330. The first wavelength selective coupler 330 combines the optical signal inputted from the first isolator 310 and pumping light inputted from the pumping light source 320 and outputs the combined optical signal to the first erbium-doped optical fiber 340.

The pumping light source 320 pumps the first erbium-doped optical fiber 340 by exciting erbium ions in the first erbium-doped optical fiber 340. In this embodiment, a laser diode capable of outputting a pumping light with a predetermined wavelength may be utilized as the pumping light source 320. The first erbium-doped optical fiber 340 is pumped by the pumping light inputted through the first wavelength selective coupler 330, then amplifies and outputs the optical signal inputted through the first wavelength selective coupler 330.

The second wavelength selective coupler 350 separates the remnant pumping light and the optical signal inputted from the first erbium-doped optical fiber 340 from each other, then outputs the separated optical signal to the second isolator 360 and the separated remnant pumping light to the third wavelength selective coupler 370. The second isolator 360 allows the optical signal inputted from the second wavelength selective coupler 350 to pass intact through the second isolator 360, while intercepting light inputted in a direction opposite to that of the optical signal. The gain flattening filter 500 is a midway filter and sequentially flattens the gain of the optical signal inputted through the second isolator 360.

Referring to FIG. 4, the gain flattening filter 500 includes a housing 510, first and second ferrules 520 and 570, first and second lenses 530 and 560, and first and second thin film filters 540 and 550. The housing 510 is shaped like a hollow cylinder having a hole with a predetermined diameter and forms an external appearance of the gain flattening filter 500. The first ferrule 520 is also shaped like a hollow cylinder having a hole with a predetermined diameter similar to the diameter of an optical fiber 400. The first ferrule 520 has an end surface opposed to the first lens 530, which is inclined at a predetermined angle, so as to minimize the signal-to-noise ratio due to the internal reflection. The inclined end surface of the first ferrule 520 is inserted into one end of the housing 510 while being opposed to the first lens 530, and the optical fiber 400 optically connected with the second isolator 360 is inserted in the hole of the first ferrule 520.

The first lens 530 collimates the optical signal emitted through one end of the optical fiber 400 inserted in the first ferrule 520 and packaged in the housing 510, so that the first lens 530 is disposed between the first ferrule 520 and the first thin film filter 540. As for the first lens 530, a graded-index rod lens (GRIN) having a predetermined pitch and a refractive index, which varies in the longitudinal direction of the lens, may be employed. The first lens 530 has an end surface opposed to the first ferrule 520, which is inclined at a predetermined angle, so as to minimize the signal-to-noise ratio due to internal reflection. The first and second thin film filters 540 and 550 are disposed between the first lens 530 and the second lens 560 and sequentially flatten the gain of the optical signal collimated by the first lens 530. Referring to FIG. 5, which shows the entire loss curve formed by superposing the loss curves of the first and second thin film filters 540 and 550, it is noted that the peak loss has a value of about 10 dB.

The second lens 560 collects the optical signal emitted through the second thin film filter 550 and packaged in the housing 510, so that the second lens 560 is disposed between the second thin film filter 550 and the second ferrule 570. As for the second lens 560, a graded-index rod lens having a predetermined pitch and a refractive index, which varies in the longitudinal direction of the lens, may be employed. The second lens 560 has an end surface opposed to the second ferrule 570, which is inclined at a predetermined angle, so as to minimize the signal-to-noise ratio due to internal reflection.

The second ferrule 570 is shaped like a hollow cylinder having a hole with a predetermined diameter similar to the diameter of the optical fiber 400. The second ferrule 570 has an end surface opposed to the second lens 560, which is inclined at a predetermined angle, so as to minimize the signal-to-noise ratio due to the internal reflection. The inclined end surface of the second ferrule 570 is inserted into the other end of the housing 510 while being opposed to the second lens 560, and the optical fiber 400 optically connected with the third wavelength selective coupler 370 is inserted in the hole of the second ferrule 570.

With continued reference to FIG. 3, the third wavelength selective coupler 370 combines the optical signal inputted from the gain flattening filter 500 and pumping light inputted from the second wavelength selective coupler 350 and outputs a combined optical signal to the second erbium-doped optical fiber 380. The second erbium-doped optical fiber 380 is pumped by a pumping light inputted through the third wavelength selective coupler 370, then amplifies and outputs the optical signal inputted from the third wavelength selective coupler 370. The third isolator 390 allows the optical signal inputted through the second erbium-doped optical fiber 380 to pass intact through the third isolator 390, while intercepting light inputted in a direction opposite to that of the optical signal.

Figure 6:
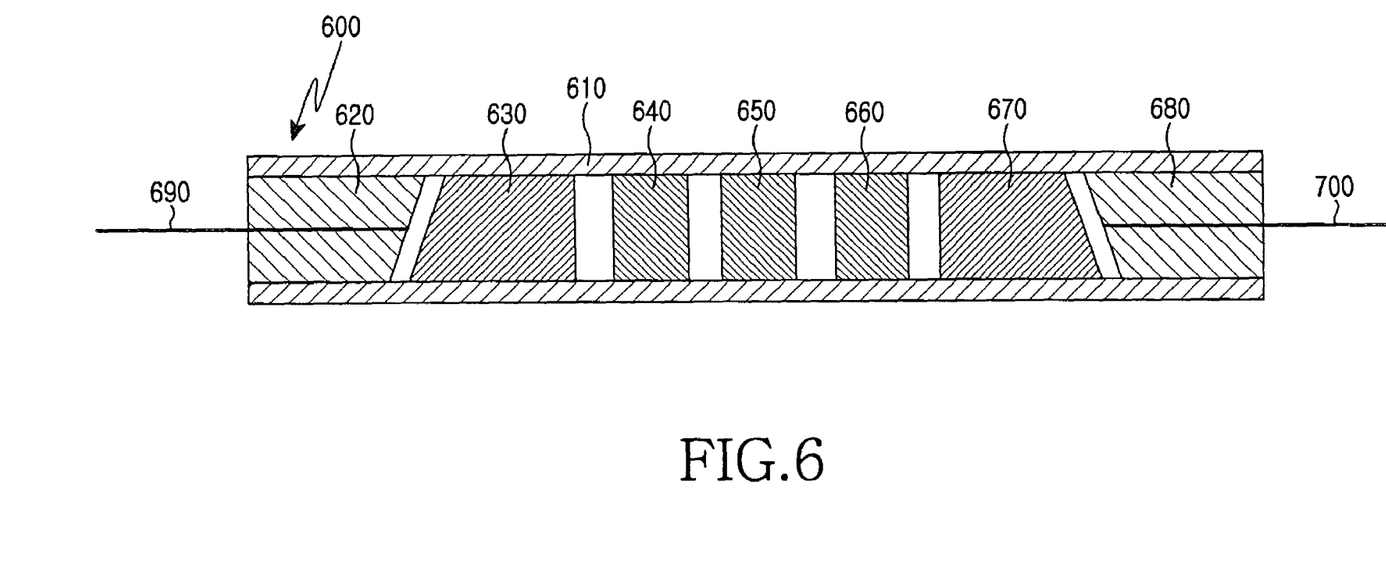
FIG. 6 is a sectional view of a gain flattening filter according to another embodiment of the present invention.

FIG. 6 is a sectional view of a gain flattening filter according to another embodiment of the present invention. The gain flattening filter 600 includes a housing 610, first and second ferrules 620 and 680, first and second lenses 630 and 670, and first to third thin film filters 640, 650, and 660. The housing 610 is shaped like a hollow cylinder having a hole with a predetermined diameter and forms an external appearance of the gain flattening filter 600. The first ferrule 620 is also shaped like a hollow cylinder having a hole with a predetermined diameter similar to the diameter of an input-side optical fiber 690. The first ferrule 620 has an end surface opposed to the first lens 630, which is inclined at a predetermined angle, so as to minimize the signal-to-noise ratio due to the internal reflection. The inclined end surface of the first ferrule 620 is inserted into one end of the housing 610 while being opposed to the first lens 630, and the input-side optical fiber 690 is inserted in the hole of the first ferrule 620.

The first lens 630 collimates the optical signal emitted through one end of the input-side optical fiber 690 and packaged in the housing 610, so that the first lens 630 is disposed between the first ferrule 620 and the first thin film filter 640. As for the first lens 630, a graded-index rod lens having a predetermined pitch and a refractive index, which varies in the longitudinal direction of the lens, may be employed. The first lens 630 has an end surface opposed to the first ferrule 620, which is inclined at a predetermined angle, so as to minimize the signal-to-noise ratio due to internal reflection. The first to third thin film filters 640, 650, and 660 are disposed between the first lens 630 and the second lens 670 while being spaced at predetermined intervals apart from each other, and sequentially flatten the gain of the optical signal collimated by the first lens 630.

The second lens 670 collects the optical signal emitted through the third thin film filter 660 and packaged in the housing 610, so that the second lens 670 is disposed between the third thin film filter 660 and the second ferrule 680. As for the second lens 670, a graded-index rod lens having a predetermined pitch and a refractive index, which varies in the longitudinal direction of the lens, may be employed. The second lens 670 has an end surface opposed to the second ferrule 680, which is inclined at a predetermined angle, so as to minimize the signal-to-noise ratio due to internal reflection.

The second ferrule 680 is shaped like a hollow cylinder having a hole with a predetermined diameter similar to the diameter of an output-side optical fiber 700. The second ferrule 680 has an end surface opposed to the second lens 670, which is inclined at a predetermined angle, so as to minimize the signal-to-noise ratio due to the internal reflection. The inclined end surface of the second ferrule 680 is inserted into the other end of the housing 610 while being opposed to the second lens 670, and the output-side optical fiber 700 is inserted in the hole of the second ferrule 680.

As described above, in a gain flattening filter according to the present invention, a plurality of thin film filers are packaged in a housing, so that various required values of peak losses can be accomplished by a single device. Also, a gain flattened optical fiber amplifier having the gain flattening filter can solve the problems of the prior art—that is, the increase of the volume and manufacturing cost of the conventional gain flattened optical fiber amplifier due to the multiple gain flattening filters.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A gain flattened, erbium-doped optical fiber amplifier comprising:
  a first erbium-doped optical fiber amplifying and outputting an inputted optical signal;
  a second erbium-doped optical fiber re-amplifying and outputting the optical signal having been amplified;
  a pumping light source outputting a pumping light;
  a first wavelength selective coupler providing the pumping light to the first erbium-doped optical fiber;
  a second wavelength selective coupler separating the remnant pumping light and the optical signal received from the first erbium-doped optical fiber;

a third wavelength selective coupler providing the remnant pumping light received from the second wavelength selective coupler and the optical signal received from a gain flattening filter to the second erbium-doped fiber; and the gain flattening filter disposed between the second and third wavelength selective couplers receiving the optical signal from the second wavelength selective coupler, comprising:

a housing having a first opening and a second opening;

a first ferrule disposed at one end of the housing, having a first inclined surface, and having an opening through which an input of an optical fiber is packaged;

a second ferrule disposed at the other end of the housing, having a second inclined surface, and having an opening through which an output of the optical fiber is packaged, wherein the first and second inclined surfaces are in a substantially non-parallel relationship; and, a plurality of thin film filters spaced a-part from each other and disposed in sequence between the first and second ferrules for flattening gain of optical signals passing therethrough, wherein the thin film filters has a peak loss of at least 7 dB.

2. A gain flattened erbium-doped optical fiber amplifier as claimed in claim 1, wherein the gain flattening filter further comprises:

a first lens disposed between the first ferrule and the thin film filters, the first lens collimating light emitted through one end of the input of the optical fiber; and, a second lens disposed between the thin film filters and the second ferrule, the second lens collecting light having been transmitted through the thin film filters.

3. A gain flattened erbium-doped optical fiber amplifier as claimed in claim 1, wherein the housing is shaped as a hollow cylinder.

4. A gain flattened erbium-doped optical fiber amplifier as claimed in claim 1, wherein the first ferrule is shaped as a hollow cylinder having a predetermined diameter that is substantially equal to a diameter of the optical fiber.

5. A gain flattened erbium-doped optical fiber amplifier as claimed in claim 2, wherein the first lens is a graded-index rod lens having a predetermined pitch and a refractive index.

6. A gain flattened erbium-doped optical fiber amplifier as claimed in claim 2, wherein the second lens is a graded-index rod lens having a predetermined pitch and a refractive index.

* * * * *